Jan. 20, 1970    J. A. HAUSER    3,490,205
HIGH PRESSURE GAS FILTER SYSTEM
Filed Nov. 30, 1967    2 Sheets-Sheet 1

INVENTOR.(S)
JOHN A. HAUSER

BY
ATTORNEYS

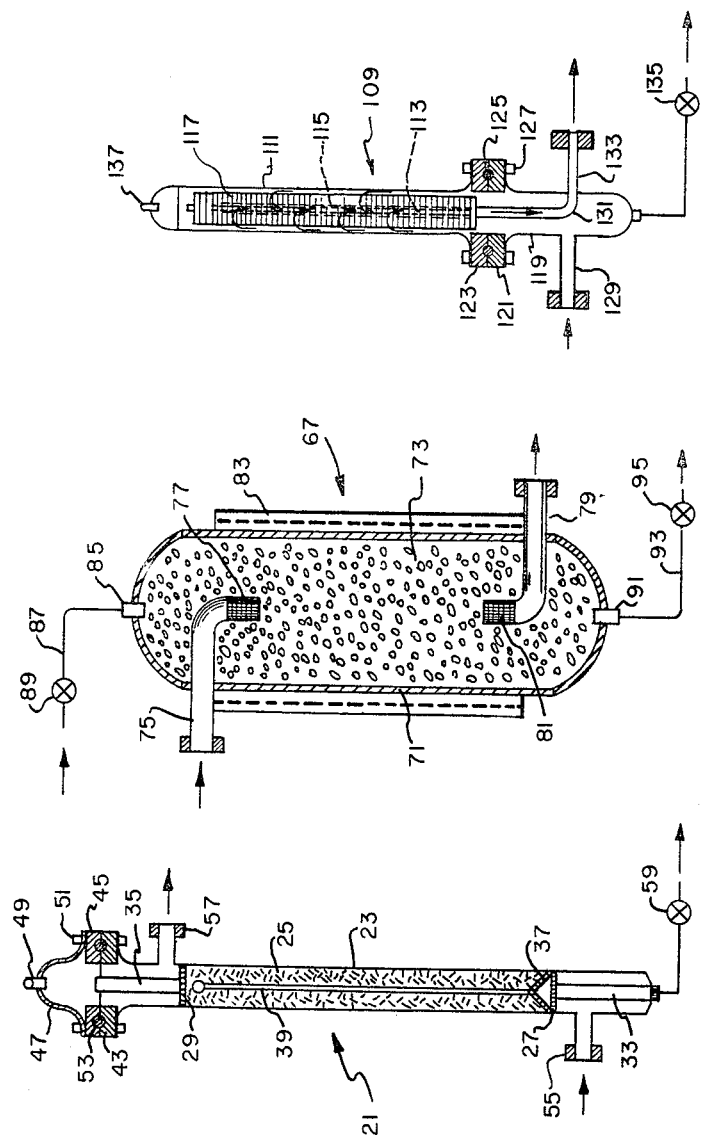

3,490,205
HIGH PRESSURE GAS FILTER SYSTEM
John A. Hauser, Decatur, Ala., assignor to the United
  States of America as represented by the Administrator
  of the National Aeronautics and Space Administration
Filed Nov. 30, 1967, Ser. No. 686,933
Int. Cl. B01d 50/00, 53/04
U.S. Cl. 55—179       1 Claim

ABSTRACT OF THE DISCLOSURE

A system for purifying and filtering gases such as air and helium that have been compressed to a high pressure by oil lubricated compressors. The purification and filtering is accomplished by passing the gas through three sequential stages as follows: (1) Scrubbing towers containing gas impingement filling or packing, such as Raschig rings, that remove droplets and mists of oil and water; (2) adsorption beds that remove further remains of mists of oil and moisture and also removes oil and moisture down to molecular size; (3) felt filter elements which by depth filter action extract oil vapors and filters any dust particles which may be generated by any agitation of the adsorption beds of stage two. The system has very high flow, holding and pressure capacities.

The invention described herein was made by an employee of the United States Government and may be manufactured and used by or for the Government for governmental purposes without the payment of any royalties thereon or therefor.

BACKGROUND OF THE INVENTION

This invention relates generally to high pressure gas purification and filtration and more particularly to an apparatus for purifying and filtering high pressure gases such as air, nitrogen and helium in great quantities to the purity standards necessary for use in research, development and test operations of space vehicles.

The development, testing and operation of space vehicles carried on pursuant to the nation's space program has resulted in unprecedented requirements as regards quantity and quality for high pressure gases such as air and helium. Great quantities of such gases are used for a variety of purposes and functions in virtually every phase of spacecraft work. One of the principal uses for these high pressure gases is as a purging medium for cleaning and drying components of space vehicles such as propellant tanks, spacecraft propulsion systems, ground support equipment and piping systems and numerous other elements and components for ground support and flight hardware. This type of purging is required repeatedly throughout the manufacturing, testing and operational procedures. These high pressure gases are also used as a means for pressure testing missile components for structural integrity and freedom from leaks as well as inerting space vehicle components and instrumentation from atmospheric contamination.

Thus, in every phase of work in the field of spacecraft it is of paramount importance that the hardware be kept ultra clean to assure safety and reliability, and high pressure gases are the cleaning and purifying agents in most instances after "specification" cleanliness has been established. Moreover, the greatest quantities of these gases are used at ambient temperatures, that is, for nearly all earth bound phases of the space vehicle development and testing including certain operational testing, but not including actual flights into the space where different temperature environments prevail. Since high pressure gases, such as helium and air, are used as cleaning mediums and as ultra pure testing mediums, it is manifest that these gases must be purified and filtered extremely well before being introduced into contact with the various missile components.

The problem is to supply these gases in the very large quantities and at the high pressures required and of the degree of purity required. This problem is made more severe due to the fact that in the process of compressing the gases to the required pressures, e.g., 5,000 p.s.i.g., oil lubricated compressors are used because of their dependability and large pumping capacities. The lubrication system of such compressors regularly inject drops of lubrication oil into each cylinder of the compressor and this oil contaminates the gas which is being compressed. It is imperative that this contaminating oil be removed from the gas before it is introduced into the storage battery tanks, and piping leading thereto, for use in the purging and testing functions discussed heretofore. Moreover, it is essential that water droplets and mists be removed from the gas as well as any measurable solid particles.

SUMMARY OF THE INVENTION

The invention comprises a three stage purifying-filtering system that has a high flow capacity, which capacity can be readily increased due to the nature of the system, and has a high pressure capacity (exceeding present state of the art requirements of approximately 6,000 p.s.i., maximum) for certain uses of the gases. The three stages of the system through which the gas is passed are as follows:

(1) A plurality of scrubbing towers containing gas impingent packing or filling, such as Raschig rings, that remove droplets and mists of oil and water from the gas.

(2) A plurality of adsorption beds for further removing mists of oil and moisture and also for removing remains of oil and moisture down to molecular size.

(3) A plurality of felt filter elements that extract oil vapors, and filters any sieve dust particles introduced into the gas by any agitation of the adsorption beds.

The sequential arrangement of the scrubbing towers, adsorption beds and depth filter elements purifies and filters high pressure gases to the degree required by specification for cleaning and testing the many space vehicle components and ground support facilities referred to previously. The gas issues from the purifying-filtering system having an extreme dryness of about −100° F. dew point and being free of contaminating nonvolatile residue as well as particulate contamination.

Accordingly, it is a general object of the present invention to provide an improved ambient temperature mode of a purifying-filter system for high pressure gases.

Another object of the invention is to provide a purifying-filter system for high pressure gases, such as air and helium, that is relatively very economical to construct, operate and maintain with very high flow and holding capacities.

Another object of the invention is to provide an apparatus for purifying and filtering high pressure gases that permits a high flow of high pressure gases and purifies and filters such gases to the degree required by applicable specifications for purging and testing of space vehicle components and ground support equipment.

Another object of the invention is to provide a system for purifying and filtering high pressure gases, such as helium and air, that have been compressed by oil lubricated compressors, the system being sufficiently effective that the oil contamination from these compressors as well as moisture and other contamination is removed from such gases to a "missile quality" degree.

These and other objects and advantages of the invention will become apparent upon reference to the following specification, attendant claims and drawings.

BRIEF DESCRIPTION OF THE DRAWING

FIGURE 2 is a schematic cross sectional view of a scrubbing tower of stage I of the purifying and filtering system in FIGURE 1;

FIGURE 3 is a schematic, cross sectional view of an adsorption vessel of stage II of the system;

FIGURE 4 is a schematic cross sectional view of one of the felt filter elements of stage III of the system.

DESCRIPTION OF THE PREFERRED EMBODIMENT

Figure 1:
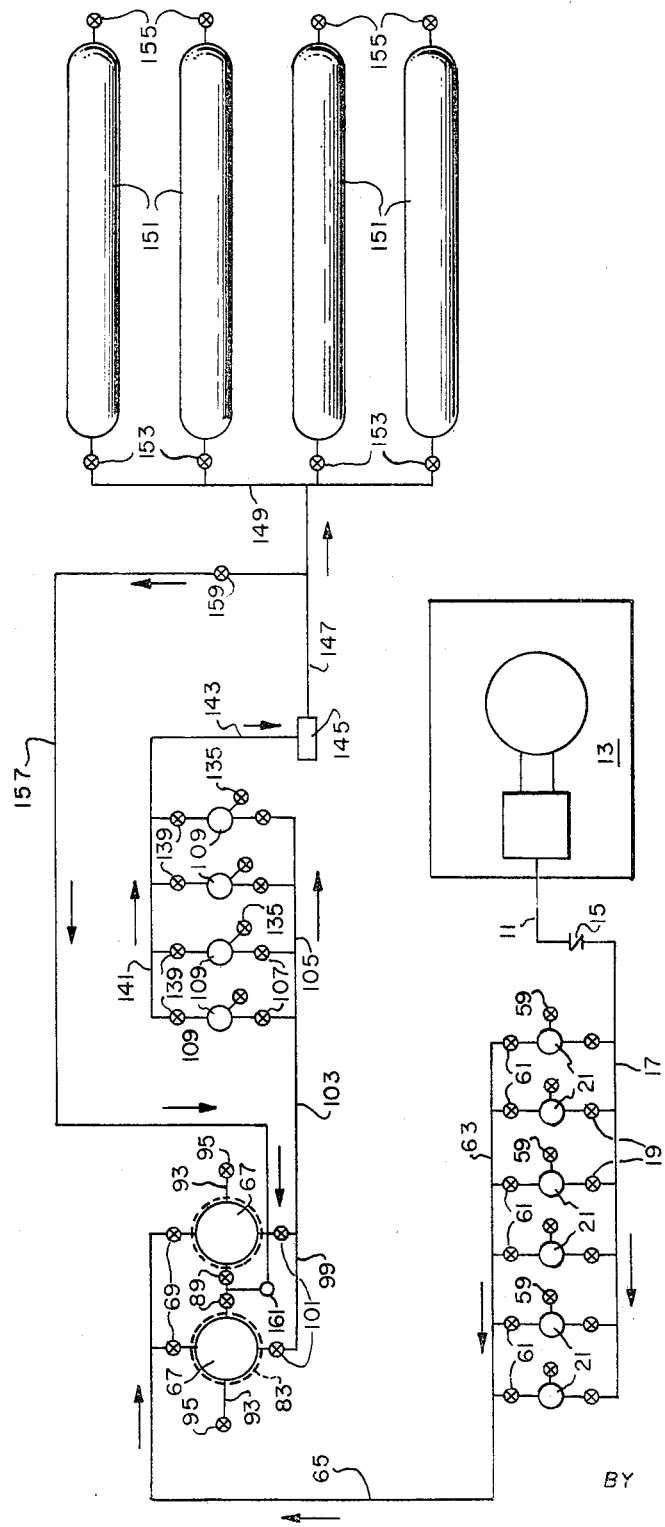
FIGURE 1 is a plan view of a flow diagram of the invention illustrating the various components and stages of the purifying and filtering system.

Referring to FIGURE 1, high pressure gas such as air or helium is introduced into the purifying and filtering system through a line 11 which conducts the gas from a bank of oil lubricated compressors 13 that compress the gas to a high pressure, normally from 3500 to 5,000 p.s.i.g. After passing through a check valve 15 the gas enters a manifold 17 that distributes the gas through respective flow control valves 19 to a series of vertically disposed scrubbing towers 21.

Referring to FIGURE 2, each of the scrubbing towers 21 comprises a vertical pipe 23 having the central region thereof filled with a gas impingement packing or filling 25, such as stainless steel Raschig rings of one-quarter inch size, random dumped into the pipe 23. The gas impingement filling 25 is disposed between a bottom support plate 27 and a top support plate 29 each of which plates is perforated for the proper flow rate of gas. The plates 27 and 29 are supported near the respective ends of the pipe 23 by a bottom supporting chair 33 and a top supporting chair 35. Resting on the bottom support plate 27 is a conical shaped stainless steel diffuser screen 37 connected to an axially disposed lifting rod 39. At the top of the pipe 23 is a heavy duty flange 43 that corresponds to a heavy duty flange 45 of a cap 47, the latter being equipped with a top plug 49. The flanges 43 and 45 are extra heavy duty in order to sustain high pressure, and these flanges are secured by bolts 51 with a sealing gasket 53 being fitted between the flanges.

A gas inlet fitting 55 is provided near the bottom of the pipe 23 and a gas outlet fitting 57 is provided near the top thereof. A blow-out or blow-down valve 59 is installed at the bottom of the pipe 23. The pipe 23 is a double extra heavy duty pipe of five inch diameter in one embodiment and capable of withstanding the high pressures exerted by the gas as it passes through the pipe.

As the high pressure gas passes into the respective scrubber towers 21 through the gas impingement fill 25 and out through the outlets 57 the oil and water droplets are removed from the gas by impinging on the infinite surface area provided by the fill 25. As previously mentioned, stainless steel Raschig rings are particularly suitable for providing the fill 25. Much of the oil and water contamination thus extracted drains by gravity to the bottom of the towers 21 for periodic blow-out through the valves 59. Each of the towers 21 has a nominal flow rate capacity of 300 s.c.f.m. at 5,000 p.s.i.g.

As indicated in FIGURE 1, the gas passes out of the respective scrubber towers 21 through control valve 61 into a manifold pipe 63 and is routed through line 65 into one of two adsorption vessels 67, passing through a control valve 69. The adsorption vessels 67 are arranged so that one vessel may be in use while the other vessel is being recharged in a manner that will be discussed hereinafter.

A schematic cross sectional view of an adsorption vessel 67 is shown in FIGURE 3 and comprises a heavy duty steel container 71 which in one embodiment of the invention is two feet in diameter and five feet in height. The container 71 is filled with adsorbent fill 73, holding about 300 pounds of this fill. A crystalline adsorbent fill has been used with excellent results and, more particularly, a fill comprising sodium zeolite Molecular Sieve, Type 13X, in 16 inch pellets. This crystalline adsorbent is produced by the Union Carbide Corporation.

Near the top of the container is an inlet fitting 75 that has a vertically directed stainless steel screen mesh 77 joined to the inner end thereof, and near the bottom of the container is an outlet fitting 79 equipped with a stainless steel screen 81. Installed around the container 71 is an electric heater system 83 for use in heating the adsorbent fill 73 during a recharging operation to be explained subsequently. At the upper end of the container 71 is an inlet fitting 85 that receives a line 87 provided with a control valve 89 and at the bottom end of the container is a similar outlet fitting 91 connected to an outlet line 93 provided with a control valve 95. These upper and lower inlet and outlet connections are also used in recharging the adsorption vessels as will be explained more fully hereafter.

As indicated previously, as the gas passes through one of the adsorption vessels 67 the adsorbent fill 73 removes mists of oil and moisture remaining in the gas and also removes oil and moisture down to molecular size. The gas passes through one of the adsorption vessels 67 at a flow rate of up to 1600 s.c.f.m. at a pressure of 5,000 p.s.i.g. and then passes out of the vessel 67 through outlet 79 into manifold 99 after passing through a control valve 101. Subsequently the gas is routed through a pipe 103 (see FIGURE 1) to an inlet manifold 105, through respective control valves 107, and into a plurality of felt filter elements 109. In one embodiment each felt filter element 109 was approximately six and one-half feet in height and five inches in diameter being made of double extra heavy duty steel pipe and fittings.

Referring to FIGURE 4, showing a schematic cross sectional view of a felt filter element 109, a vertical pipe 111 has therein a stainless steel perforated ¾ inch O.D. tube 113 extending throughout most of the length of the felt filter element. Around the tube 113 is a stainless steel wire mesh covering 115 and stacked around the tube 113 throughout its length are numerous felt wafer elements 117, there being about 124 in a previous embodiment. These felt filter wafers 117 are somewhat less in outside diameter than the inside diameter of the pipe 111 thus leaving a vertically extending annular space between the inside diameter of the pipe 111 and the outside diameter of the felt wafers 117.

A bottom section 119 of the felt filter element 109 is separable from the remainder of the element by virtue of flanges 121 and 123 on the section 119 and pipe 111, respectively. A sealing gasket 125 is disposed between the flanges and the flanges are bolted by bolts 127. As can be readily seen, removal of the section 119 gives access to the internal parts of the filter element 109.

The high pressure gas enters the filter element 109 through an inlet fitting 129 and moves upwardly around the felt filter wafers 117 and passes through these felt filter wafers into the axially disposed tube 113. Thereafter the gas moves downwardly into an exit pipe 131 and out through an outlet fitting 133.

At the bottom end of the filter element 109 is a vent valve 135 and at the upper end of the filter element is a plug 137. The nominal flow rate through each one of the felt filter elements 109 is 500 s.c.f.m. at a pressure of 5,000 p.s.i.g. When the gas passes through the felt filter elements depth filter action is performed on the gas and this extracts any remaining oil vapors, and filters any sieve dust particles which may have been introduced into the gas by agitation of the fill in the adsorption vessels 67.

Upon issuance from the felt filter towers 109 the gas passes through control valves 139 (see FIGURE 1) into a discharge manifold 141 and through a line 143 where it enters a 10 micron stainless steel woven element check filter 145. From the filter 145 the gas passes through a line 147 to a manifold 149 and into a battery of high pressure storage tanks 151, each tank being equipped with control valves 153 and 155. The purpose of the check filter 145 is to act as a safety filter element to catch any "lint migration" which could conceivably come from the felt filter elements 109.

As appears from the foregoing, when a high pressure gas such as air or helium has been processed through the three purifying and filtering stages described, the water and oil droplets have been removed, the oil and water mists and moisture, down to molecular size, have been removed, and all contaminating particulate matter has been removed. When the gas is stored in the battery of tanks 151 it is pure and clean as required by applicable specifications and pressurized to the degree necessary for use in the many cleaning, purging and testing procedures carried on in the work of spacecraft research and development.

As indicated previously, it is desirable to have a reserve adsorption vessel 67 that can be cut out of the purifying and filtering system during operation of the system so that this vessel may be recharged, i.e., dried out and cleaned of entrapped contaminates. This hot drying recharging process involves two different treatments of the adsorbent fill 73. One of these treatments is the heating of the adsorbent fill with the electrical heater system 83 which will heat the sieve fill to a temperature of from 300° to 500° F. thus drying it out considerably.

The second treatment is the passing through of the entire fill 73 with extremely dry and clean high pressure gas that has been completely processed through the purifying and filtering system this gas being heated prior to entering the particular vessel 67 being recharged so as to augment the heating effect of the heater 83 and also to provide a more uniform heat distribution throughout the adsorbent fill.

The recharging gas is tapped off of the line 147 through a line 157 (see FIGURE 1) that is equipped with a control valve 159 near the line 147. The gas tapped off is directed to an electric preheater element 161 that heats the recharging gas prior to introducing it into the adsorption vessel 67 that is being recharged. The valve 89 which opens the top inlet 85 on the vessel 67 is opened and the purge out vent valve 95 at the bottom of the vessel is also opened permitting the extra dry, clean and heated gas to pass through the adsorbent fill 73 under high pressure, thus thoroughly drying out the fill material. Since the gas passing therethrough is extremely dry, it readily absorbs any residual moisture remaining in the adsorbent fill. After the hot drying process has been completed, cooling of the fill material may be accelerated by passing unheated gas through the fill thus shortening the total required recharging time.

The capacity of the inventive purifying-filtering system may be increased without great cost by increasing the number of units in the three stages described. The system's construction, operation and maintenance costs are very economical and the system has virtually unlimited flow and contaminating matter holding capacities. The internal components of each of the units are easily and selectively accessible for cleaning, repair or replacement. It is understood that in actual construction of the purifying and filtering system, pressure gauges, relief valves and special types of valves may be incorporated as deemed desirable to satisfy good engineering and safety requirements.

The time interval between recharging of the adsorption vessels 67 is best determined by experience since the frequency of recharging depends on circumstances such as quantity of gas processed and the degree of gas contamination. Experience thus far indicates that under "average" circumstances recharging should be performed when an adsorption vessel has been in use between one and two weeks. No recharging or blow-out is used with the felt filter elements 109. After prolonged usage the filter wafers 117 may be easily replaced if replacement is indicated.

I claim:
1. A three stage system for purifying and filtering high pressure gases in a fluid flow system comprising:
   (a) a first stage comprising a plurality of conduits, each having a gas inlet and a gas outlet spaced longitudinally of said conduit, first stage piping and valve means having an inlet and an outlet and being operatively connected to each said conduit inlet and outlet and constructed and arranged for selectively connecting one or more of said conduits in parallel in said fluid flow system with fluid flowing in parallel through said one or more conduits when more than one of said conduits is operatively connected in said fluid flow system;
   (b) each said conduit having therein a gas impingement fill comprising a fill of stainless steel Raschig rings located between said inlet and said outlet of each said conduit;
   (c) a second stage comprising a plurality of vessels each having a gas inlet and a gas outlet separated longitudinally of a respective one of said vessels, second stage piping and valve means having an inlet and an outlet and being operatively connected to each of said vessel inlets and outlets and constructed and arranged for selectively and alternatively passing fluid to be treated first into one of said vessels while there is no flow of fluid to be treated through the remainder of said vessels and then through another of said vessels and not through said first vessel;
   (d) each of said vessels having therein a crystalline zeolite molecular sieve bed substantially filling each of said vessels and located between said inlet and said outlet of the respective vessel;
   (e) a third stage comprising a plurality of pipes, each said pipe having a gas inlet and a gas outlet, third stage piping and valve means having an inlet and an outlet and being operatively connected to each said pipe inlet and outlet and selectively connecting one or more of said pipes in parallel in said fluid flow system with the fluid flowing in parallel through said one or more pipes when more than one is operatively connected in said fluid flow system;
   (f) felt filter means disposed in each said pipe in the gas flow path between said inlet and said outlet of each said pipe;
   (g) said felt filter means comprising a respective perforated tube within each said pipe extending longitudinally and axially of said respective pipe;
   (h) said felt filter means further comprising felt wafer filter elements of smaller diameter than said respective pipe stacked on a respective one of said perforated tubes with each said tube communicating with a respective one of said outlet of said pipe;
   (i) conduit means extending between and interconnecting said outlet of said first stage piping and valve means and said inlet of said second stage piping and valve means and conduit means extending between and interconnecting said outlet of said second stage piping and valve means and said inlet of said third stage piping and valve means;
   (j) a check filter downstream of said third stage for filtering any lint migration from said felt filter elements;
   (k) means for tapping off gas downstream of said check filter and routing tapped off gas alternatively through any one of said vessels when gas to be purified is not passing through said vessel for drying and cleaning said bed;
   (l) means for heating said tapped off gas prior to entry of said gas into said vessels.

(References on following page)

References Cited

UNITED STATES PATENTS

| | | | |
|---|---|---|---|
| 3,107,987 | 10/1963 | Duer | 55—486 X |
| 931,868 | 8/1909 | Hegeler et al. | 55—316 X |
| 1,939,695 | 12/1933 | Hesche | 55—62 |
| 2,011,550 | 8/1935 | Hesche | 62—18 X |
| 2,011,551 | 8/1935 | Hesche | 62—18 X |
| 2,698,061 | 12/1954 | Jaubert | 55—316 |
| 3,164,453 | 1/1965 | Milton | 55—35 |
| 3,221,477 | 12/1965 | Arnoldi et al. | 55—62 X |

OTHER REFERENCES

PTB Bulletin HA–308C, Heat-less Dryers, Pall Trinity Micro Corporation, Cortland, N.Y. 13046, received July 14, 1967, 6 pages.

PTM Bulletin A–309a, Type A Heat-Reactivated Desiccant Dryers, Pall Trinity Micro Corporation, Cortland, N.Y. 13046, received July 14, 1967, 6 pages.

PTM Bulletin GP–322, Pall Trinity Micro Corporation, Cortland, N.Y. 13046, received July 14, 1967, 10 pages.

Staynew Pipe Line Filters, Dollinger Bulletin No. 200, Dollinger Corporation, Rochester, N.Y., received July 7, 1966, 8 pages.

Tower Packings, U.S. Stoneware Bulletin No. TP54, U.S. Stoneware, Akron, Ohio, Copyright 1957, p. 7.

HARRY B. THORNTON, Primary Examiner

DENNIS E. TALBERT, Jr., Assistant Examiner

U.S. Cl. X.R.

55—208, 278, 316, 389, 417, 418, 484, 518, 527, 525, 343, 350